(12) United States Patent
Knechtges et al.

(10) Patent No.: US 10,618,414 B2
(45) Date of Patent: Apr. 14, 2020

(54) BRAKE SYSTEM FOR A LAND VEHICLE AND METHOD FOR CONTROLLING THE BRAKE SYSTEM

(71) Applicant: Lucas Automotive GmbH, Koblenz (DE)

(72) Inventors: Josef Knechtges, Mayen (DE); Andreas Marx, Hartenfels (DE)

(73) Assignee: Lucas Armstrong GmbH, Koblenz (DE)

( * ) Notice: Subject to any disclaimer, the term of this patent is extended or adjusted under 35 U.S.C. 154(b) by 42 days.

(21) Appl. No.: 14/648,308

(22) PCT Filed: Nov. 18, 2013

(86) PCT No.: PCT/EP2013/074048
§ 371 (c)(1),
(2) Date: May 29, 2015

(87) PCT Pub. No.: WO2014/082885
PCT Pub. Date: Jun. 5, 2014

(65) Prior Publication Data
US 2015/0314686 A1      Nov. 5, 2015

(30) Foreign Application Priority Data

Nov. 29, 2012    (DE) .................. 10 2012 023 345

(51) Int. Cl.
*B60T 13/68*      (2006.01)
*B60L 7/26*       (2006.01)
(Continued)

(52) U.S. Cl.
CPC    *B60L 7/26* (2013.01); *B60L 7/14* (2013.01); *B60L 15/2009* (2013.01); *B60T 1/10* (2013.01);
(Continued)

(58) Field of Classification Search
CPC .. B60L 7/26; B60L 15/2009; B60L 2240/423; F16D 2066/006; B60T 8/171;
(Continued)

(56) References Cited

U.S. PATENT DOCUMENTS 4,197,710 A  *  4/1980  Leiber .................. B60T 13/143
                                                     60/547.1
5,505,527 A  *  4/1996  Gray, Jr. .................. B60K 6/00
                                                        180/165
(Continued)

FOREIGN PATENT DOCUMENTS

DE    102008003664 A1 *  7/2009 ............. G60T 8/266
DE    102009039207 A1     3/2011
(Continued)

OTHER PUBLICATIONS

"Determine the Characteristic Curve of an Installed Control Valve". Sines, Jeff. 3 pages. Engineered Software, Inc. (Year: 2009).*
(Continued)

*Primary Examiner* — Bradley T King
*Assistant Examiner* — Stephen M Bowes
(74) *Attorney, Agent, or Firm* — MacMillan, Sobanski & Todd, LLC

(57) ABSTRACT

A hydraulic brake system for a land vehicle includes a brake pedal; a wheel brake; and a master brake cylinder connected to the brake pedal by a brake booster and a pump. The outlet of the pump is connected to the wheel brake by a supply line and the inlet is connected to the wheel brake by a return line. The pump moves hydraulic fluid to the wheel brake. A temporary store is connected to the inlet of the pump and the wheel brake by the return line. A pressure reduction valve, arranged in the return line of the wheel brake, has a throttling effect in the open state. A control unit compensates for the difference between a total braking torque specified by the (Continued)

brake pedal and a generating braking torque provided by an electric machine by setting the hydraulic braking torque during a regenerative braking process of the vehicle.

12 Claims, 4 Drawing Sheets

(51) Int. Cl.
    *B60T 7/04*     (2006.01)
    *B60L 15/20*     (2006.01)
    *B60T 1/10*     (2006.01)
    *B60L 7/14*     (2006.01)
    *B60T 8/48*     (2006.01)

(52) U.S. Cl.
    CPC ............ B60T 7/042 (2013.01); B60T 13/686 (2013.01); *B60L 2250/26* (2013.01); *B60L 2260/44* (2013.01); *B60T 8/4872* (2013.01); *B60T 2270/604* (2013.01); *Y02T 10/645* (2013.01); *Y02T 10/72* (2013.01); *Y02T 10/7275* (2013.01)

(58) Field of Classification Search
    CPC ........ B60T 8/172; B60T 7/042; B60T 13/586; B60T 2220/04; B60T 2220/604; B60T 2220/88
    See application file for complete search history.

(56) References Cited

U.S. PATENT DOCUMENTS

| | | | | |
|---|---|---|---|---|
| 5,806,939 A * | 9/1998 | Feigel | .................... | B60T 8/1755 |
| | | | | 303/113.5 |
| 5,967,621 A * | 10/1999 | Ito | .............................. | B60T 8/00 |
| | | | | 303/15 |
| 6,412,882 B1 * | 7/2002 | Isono | ....................... | B60K 6/22 |
| | | | | 303/11 |
| 8,668,280 B2 | 3/2014 | Heller et al. | | |
| 2006/0138861 A1 * | 6/2006 | Buschmann | .............. | B60T 8/34 |
| | | | | 303/122.08 |
| 2007/0013230 A1 * | 1/2007 | Yang | .......................... | B60L 7/26 |
| | | | | 303/152 |
| 2007/0284936 A1 * | 12/2007 | Maki | ...................... | B60K 6/445 |
| | | | | 303/15 |
| 2008/0116743 A1 * | 5/2008 | Jeon | .......................... | B60L 3/10 |
| | | | | 303/152 |
| 2008/0265662 A1 * | 10/2008 | Karnjate | ................... | B60T 7/06 |
| | | | | 180/65.27 |
| 2010/0276239 A1 * | 11/2010 | Wuerth | ................... | B60T 8/266 |
| | | | | 188/358 |
| 2012/0299367 A1 | 11/2012 | Ross et al. | | |
| 2013/0204502 A1 | 8/2013 | Biller et al. | | |
| 2014/0152082 A1 | 6/2014 | Strengert et al. | | |

FOREIGN PATENT DOCUMENTS

| | | |
|---|---|---|
| DE | 102011003346 A1 | 9/2011 |
| DE | 102011017595 A1 | 10/2011 |
| DE | 102010041853 A1 | 4/2012 |
| DE | 102012205713 A1 | 10/2012 |
| DE | 102011075971 A1 | 11/2012 |
| EP | 1888387 B1 | 7/2009 |
| WO | 2006131366 A1 | 12/2006 |

OTHER PUBLICATIONS

PCT International Search Report and the Written Opinion, Application No. PCT/EP2013/074048 filed Nov. 18, 3012, dated Feb. 24, 2014.

* cited by examiner

Fig. 4
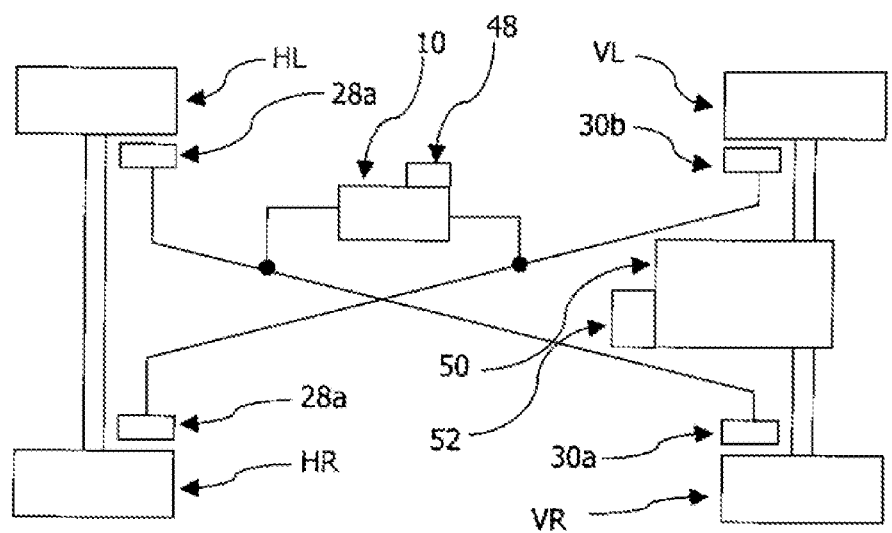
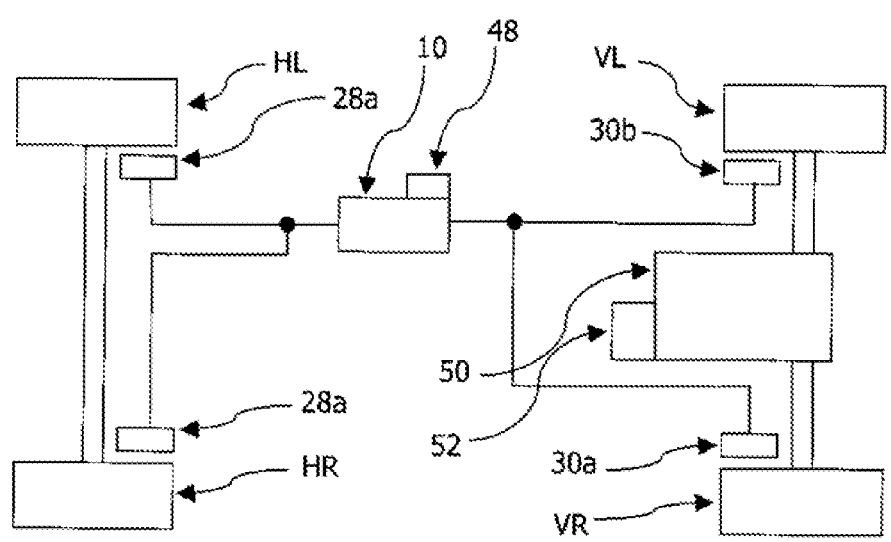
Fig. 5

BRAKE SYSTEM FOR A LAND VEHICLE AND METHOD FOR CONTROLLING THE BRAKE SYSTEM

CROSS-REFERENCE TO RELATED APPLICATIONS

This application is a national stage of International Application No. PCT/EP2013/074048, filed Nov. 18, 2013, which claims priority to German Patent Application No. 10 2012 023 345.0, filed Nov. 29, 2012, the disclosures of which are incorporated herein by reference in their entirety.

BACKGROUND OF THE INVENTION

What is described here is a vehicle brake system for a land vehicle which enables regenerative braking, that is to say, a braking operation in which an electric machine converts kinetic energy of the land vehicle into electrical energy.

As a rule, vehicles have a vehicle-braking installation in which, for braking purposes, a hydraulic fluid is conducted to wheel brakes of a vehicle. Increasingly, however, vehicles also have an electric machine which serves to drive the vehicle in a manner which at least provides assistance to an internal combustion engine. Compared to an internal combustion engine, the electric machine offers the advantage that, when so-called "regenerative braking" occurs, it can be operated in a generating manner in order to charge a vehicle battery. The chemical energy stored in the charged battery is then reused, in a motor mode of the electrical machine, for driving the motor vehicle.

Whereas, in normal braking mode, motional energy of the vehicle is converted into thermal energy because of the frictional interaction of brake shoes and brake discs at the wheel brakes, in regenerative braking mode, charging of the vehicle battery thus takes place. Since, in regenerative braking mode, the braking of the motor vehicle takes place by means of the electric machine, the wheel brakes can remain un-actuated. As a rule, this is even desirable, since any motional energy converted into thermal energy at the wheel brakes is no longer available for charging the vehicle battery.

Thus, for example, document DE 10 2009 039 207 A1 describes a regenerative vehicle brake and a method of operation for a regenerative vehicle brake which has a regenerating apparatus which enables an asymmetric regenerative braking operation for a first and a second hydraulic brake circuit.

However, the vehicle brake described in document DE 10 2009 039 207 A1 comprises more components than conventional brake systems. These additional components require additional installation space and increase the weight of the system. In addition, pedal reaction-simulating apparatuses which are employed in regenerative vehicle brakes often involve more complicated control of the brake system or exhibit, in some cases, an unsatisfactory quality of control.

A large number of measures are known from the prior art for the purpose of changing the braking behaviour in conventional braking operations, that is to say, braking operations without the recovery of energy. Thus, for example, document EP 1 888 387 B1, and corresponding U.S. Pat. No. 8,668,280 B2, both of which are incorporated by reference herein, describes back-pressure control. For this purpose, a pump and a valve of a wheel brake valve arrangement are provided, wherein the valve comprises a throttle which is operative when the valve is in the open state. By actuation of the pump, a back pressure is generated on the input side of the wheel brake when the valve is opened. As a result of the back pressure which is produced, it is possible to compensate, when automatic braking operations occur, for disruptive influences—such as, for example, unequal air clearances between brake pistons and brake linings, unequally worn brake linings or displaced brake pistons. In addition, it is possible to avoid unfavourable characteristics of the pump at a low delivery output.

BRIEF SUMMARY OF THE INVENTION

A feature of the invention is therefore to make available a vehicle brake system which is of simple design and can be manufactured in a cost-effective manner. In addition, the brake system is to exhibit a high quality of control in order to provide the driver with a reassuring braking behaviour and braking sensation.

What is proposed for achieving this feature is a hydraulic brake system for a land vehicle, wherein the hydraulic brake system is adapted to enable a regenerative braking operation of said land vehicle. The hydraulic brake system comprises a brake pedal which can be actuated by the driver; a wheel brake which is associated with a wheel of the land vehicle; a master brake cylinder which is connected to the brake pedal via a brake booster and is adapted to displace hydraulic fluid into the wheel brake when the brake pedal is actuated; a pump, the output of which is connected to the wheel brake via a feed line and the input of which is connected to the wheel brake via a return line, wherein the pump is adapted to convey hydraulic fluid to the wheel brake; a temporary store which is connected, via the return line, to the input of the pump and to the wheel brake; and a pressure reduction valve which is arranged in the return line of the wheel brake and has a throttling effect in the open state. The hydraulic brake system further comprises a control unit which is adapted to compensate, during a regenerative braking operation of the land vehicle, for the difference between a total braking torque set by the driver by actuation of the brake pedal and a generating braking torque provided by an electric machine by adjustment of the hydraulic braking torque, wherein the control unit, for the purpose of adjusting the hydraulic braking torque: ascertains a difference between the total braking torque and the generating braking torque; ascertains a necessary braking pressure from the difference of the total braking torque and the generating braking torque; estimates volume flows via the pressure reduction valve on the basis of the switching state and the throttling effect of said pressure reduction valve; ascertains an intake of volume by the temporary store on the basis of the estimated volume flow; estimates a current braking pressure on the basis of a displacement of volume, which displacement corresponds to an actuating travel of the brake pedal, from the master brake cylinder to the wheel brake, and on the basis of the ascertained intake of volume by the temporary store; and sets a switching state for the pressure reduction valve in dependence upon the ascertained necessary braking pressure and the current braking pressure.

What is proposed, according to a further aspect, is a land vehicle which has the brake system defined above, an electric machine and a control apparatus associated with said electric machine. Under these circumstances, the control apparatus controls the building-up of the generating braking torque of the electric machine in dependence upon a pressure reduction gradient which is determined by the throttling effect of the pressure reduction valve.

Also proposed is a method for controlling a hydraulic brake system during a regenerative braking operation. In reaction to a desire to brake on the part of the driver, a difference between a total braking torque and a generating braking torque provided by an electric machine is ascertained by a control unit, wherein the total braking torque corresponds to the desire to brake set by the driver; a necessary braking pressure is ascertained from the difference in the total braking torque and the generating braking torque; a volume flow via a pressure reduction valve is estimated on the basis of the switching state and the throttling effect of said pressure reduction valve; an intake of volume by a temporary store is ascertained on the basis of the estimated volume flow; a current braking pressure is estimated on the basis of a displacement of volume, which displacement corresponds to an actuating travel of the brake pedal, from a master brake cylinder to a wheel brake, and on the basis of the calculated intake of volume by the temporary store; and an opening of the pressure reduction valve is brought about in dependence upon the ascertained necessary braking pressure and the current braking pressure.

Also proposed is a computer-readable data-carrier on which there is stored a computer-programming product which, when executed by a control unit of a brake system, executes the method defined above.

Since the building-up of the hydraulic braking torque takes place in the same, or at least a similar way, as in a purely hydraulic braking operation, the driver can be provided with the customary braking sensation, even without an additional simulating apparatus. In addition, the function described can be implemented in a conventional anti-locking system or driving dynamics control system; in this case, all that is necessary is to modify the control unit accordingly.

When a regenerative braking operation occurs, the brake system is able to provide the necessary hydraulic braking torque, only a minimum of valve-switching operations being required for controlling the braking torque.

The hydraulic brake system may comprise two, three, four or more wheel brakes with a pressure reduction valve in each case. Under these circumstances, a wheel brake may be associated with each wheel of the land vehicle, so that the number of wheel brakes is determined by the particular land vehicle. Whereas, as a rule, conventional private cars have four wheels and therefore four wheel brakes, utility vehicles, for example, may have four or six wheels and therefore four or six wheel brakes.

The wheel brakes may be combined at least to form one brake circuit. The land vehicle may have, for example, two brake circuits with two wheel brakes and therefore with two pressure reduction valves. The wheel brakes may be combined in such a way that the wheel brakes associated with a front axle and the wheel brakes associated with a rear axle may form a brake circuit in each case. As an alternative to this, however, diagonally opposite wheel brakes may also be combined to form a brake circuit.

For the purpose of adjusting the hydraulic braking torque, the control unit may be further adapted to estimate, for each brake circuit, the volume flows via the pressure reduction valves on the basis of the respective switching states and throttling effects, and to set switching states for said pressure reduction valves in dependence upon the ascertained necessary braking pressure and the current braking pressure. Thus, for example, in the case of a brake circuit comprising two wheel brakes, the control unit may bring about the opening of one or both pressure reduction valves. Under these circumstances, the control unit may open the pressure reduction valve whose throttling effect is most suitable for bringing about a desired change in the braking pressure in the wheel brakes of the brake circuit.

If the change in hydraulic braking torque caused by an open pressure reduction valve is not sufficient, on its own, to compensate for the difference between the total braking torque and the generating braking torque, the control unit may also be adapted to set a delivery output for the pump in such a way that the current braking pressure corresponds to the necessary braking pressure.

The delivery output set for the pump may correspond to a displacement of volume to the wheel brakes which is smaller than, equal to or greater than the displacement of volume via the open pressure reduction valve. Thus it is possible, for example with a displacement of volume which is greater than the displacement of volume via an open pressure reduction valve, for braking pressure, and therefore a hydraulic braking torque, to be built up in the wheel brakes. If, for example, the displacements of volume to the wheel brake correspond to the displacement of volume via the open pressure reduction valve, the braking pressure in the wheel brakes can be kept constant in spite of an open pressure reduction valve. With a displacement of volume to the wheel brakes which is smaller than the displacement of volume via the open pressure reduction valve, it is possible, for example, to delay the drop in the braking pressure in the wheel brakes. It is thus possible, by means of the delivery output of the pump, to adapt the change in braking pressure in the wheel brakes more accurately to a desired change.

The hydraulic brake system may comprise a first isolating valve and a second isolating valve, wherein said first and second isolating valves are adapted to completely or partially shut off the feed line to the first or second wheel brake respectively.

The control unit may also be adapted to completely or partially close the first and second isolating valves during the regenerative braking operation. The resulting pedal reaction at the brake pedal is able to provide the driver with a customary braking sensation, even without an additional pedal reaction-simulating apparatus. The control unit may also be adapted to not close the first and second isolating valves until the brake booster intervenes.

The control unit and the pressure reduction valves may also be adapted in such a way that the control unit varies the throttling effect of a pressure reduction valve by the alternating opening and closing, or partial opening, of said pressure reduction valve.

Other advantages of this invention will become apparent to those skilled in the art from the following detailed description of the preferred embodiments, when read in light of the accompanying drawings.

BRIEF DESCRIPTION OF THE DRAWINGS

FIG. 4 shows a first diagrammatic representation of a land vehicle; and

FIG. 5 shows a second diagrammatic representation of a land vehicle.

DETAILED DESCRIPTION OF THE INVENTION

Figure 1:
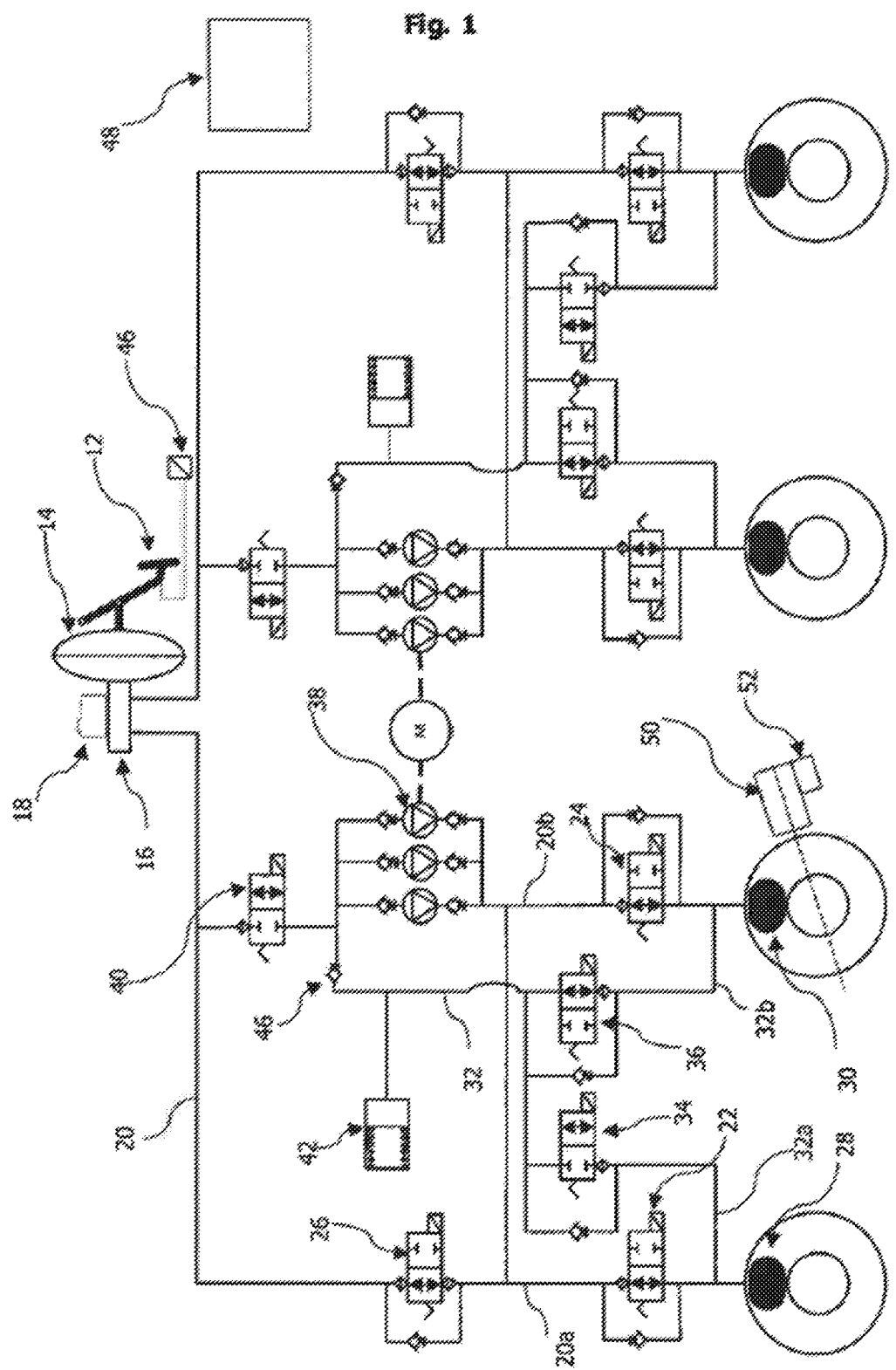
FIG. 1 shows a diagrammatic representation of a hydraulic brake system.

Examples of embodiment of a hydraulic brake system of a land vehicle will be described below. In this connection, elements which are identical are designated by the same reference symbols in the drawings.

FIG. 1 shows a diagrammatic representation of the hydraulic brake system 10. Said brake system 10 enables a regenerative braking operation of the land vehicle, that is to say a decelerating operation in which an electric machine belonging to the land vehicle converts the motional energy of said land vehicle into electrical energy. The brake system 10 has two brake circuits which are separated from one another hydraulically, said brake system being explained below with reference to one brake circuit. What is stated with regard to the components of this brake circuit applies in a corresponding manner to the other brake circuit. Even though consideration is given, below, to only one brake circuit, there are interactions between the two brake circuits. Thus, equalisation of pressure takes place via a master brake cylinder of the land vehicle, so that, as a rule, the same braking pressure occurs in both brake circuits.

The brake system 10 shown in FIG. 1 has a brake pedal 12. Said brake pedal 12 is connected to a master brake cylinder 16 via a brake booster 14. Said master brake cylinder 16 is connected to a brake fluid reservoir 18 in which the hydraulic fluid is stored.

The master brake cylinder 16 is connected to the first wheel brake 28 and the second wheel brake 30 via feed lines 20, 20a, 20b. A first isolating valve is provided in the feed line 20a to the first wheel brake 28, said first isolating valve 22 being adapted to selectively shut off said feed line 20a to the first wheel brake. A second isolating valve 24 is provided in the feed line 20b to the second wheel brake 30, said second isolating valve 24 being adapted to selectively shut off said feed line 20b to the second wheel brake 30. Arranged in the feed line 20, between the master brake cylinder 16 and the wheel brakes, is a third isolating valve 26 which is adapted to shut off said feed line 20. In the closed switching state, therefore, said third isolating valve 26 isolates the master brake cylinder 16 from the wheel brakes 28, 30.

From the first and second wheel brakes 28, 30, return lines 32, 32a, 32b lead to an input of a pump 38. A first pressure reduction valve 34 is arranged in the return line 32a from the first wheel brake 28, said first pressure reduction valve 34 being adapted to selectively shut off said return line 32a from the first wheel brake 28. A second pressure reduction valve 36 is arranged in the return line 32b from the second wheel brake 30, said second pressure reduction valve 36 being adapted to selectively shut off said return line 32b from the second wheel brake 30.

The brake system 10 represented has a temporary store 42. Said temporary store 42 is connected to the return line 32 and adapted to temporarily receive hydraulic fluid flowing out of the wheel brakes 28, 30. Said temporary store 42 may be a low-pressure store. The pressure in the temporary store 42 may amount, for example, to 2 bar. A shut-off valve 46 is provided in the feed line 32 between the temporary store 42 and the input of the pump 38. Further shut-off valves which serve to limit pressure are provided, parallel to the isolating valves 22, 24, 26 and the pressure reduction valves 34, 36, in order to bridge the latter when the pressure occurring on one side of the shut-off valves exceeds a set value.

The pump 38 is adapted to deliver hydraulic fluid to the wheel brakes 28, 30. For that purpose, the output of said pump 38 is connected to the feed line 20. The input of the pump 38 is connected to a supply valve 40, so that said input of the pump 38 can be connected to the brake fluid reservoir 18 by the supply valve 40. As a result of the opening of the supply valve 40, the pump 38 is able to draw in hydraulic fluid from the brake fluid reservoir 18. Said pump 38 may be a radial-piston pump whose delivery output is variable, the pump represented in FIG. 1 being a radial-piston pump having six pistons.

The isolating valves 22, 24, 26, pressure reduction valves 34, 36 and supply valves 40 may be, for example, electromagnetically actuatable 2/2-way valves. In the normal position, the isolating valves 22, 24, 26 are open valve arrangements which, in the normal position (not supplied with current) allow a hydraulic fluid to flow through. The pressure reduction valves 34, 36 and the supply valve 40 are valve arrangements which are closed in the normal position and which, in said normal position (not supplied with current), prevent hydraulic fluid from flowing through. However, it is also possible to use other valves for achieving the same effect.

The isolating valves 22, 24, 26 and the pressure reduction valves 34, 36 may be adapted to be completely or partially activated. In the case of partial activation of the valves, the activating energy is not sufficient to open or close them completely. The valves are therefore in a partially open switching state, so that a smaller volume of hydraulic fluid flows away via the valves than in the completely open switching state.

Also represented in FIG. 1 is a control unit 48. Said control unit 48 is connected, in an electrically conductive manner, to the isolating valves 22, 24, 26, the pressure reduction valves 34, 36 and the supply valve 40, and is adapted to set switching states for these valves. This activation of the valves may also be described as opening or closing them. The control unit 48 is also connected, in an electrically conductive manner, to a motor of the pump 38 and is adapted to set the delivery output of said pump 38. Thus, for example, the control unit 48 may emit a pulse width modulation signal (PWM signal) and thereby set the rotational speed of the pump 38. For reasons of clarity, the respective electrical connections are not represented.

Also arranged on the brake pedal 12 is a pedal travel sensor 46 for detecting the actuation of said brake pedal 12, said pedal travel sensor 46 transmitting to the control unit 48 a signal which corresponds to the actuation of the brake pedal 12. The brake system may have other components, such as sensors for example, although these are not absolutely necessary for understanding the present brake system and, for reasons of clarity, are not represented here.

An electric machine 50 is indicated in FIG. 1. Said electric machine 50 is adapted to convert kinetic energy of the land vehicle into electrical energy during a decelerating operation. The electric machine 50 thus generates a generating braking torque. Said electric machine 50 may be part of the land vehicle's drive train. The electric machine may also be a generator which is coupled, independently of the drive train, to the wheels of the land vehicle and is specifically provided for converting kinetic energy into electrical energy. The operation of the electric machine 50 is controlled by a control apparatus 52. Said control apparatus 52 is connected to the control unit 48 of the brake system. Data and/or control signals may accordingly be exchanged between the control apparatus 52 of the electric machine and the control unit 48 of the brake system. Besides two separate control systems for the brake system 10 and the electric machine 50, a common control system may also be provided.

The first and second pressure reduction valves 34, 36 are designed in such a way that, in their completely open switching state, they obstruct the flow of the hydraulic fluid. Said first and second pressure reduction valves 34, 36 accordingly each have a throttling effect. The extent of said throttling effect is determined, for example, by the shape of the valve seat, the size of the valve opening and any narrowing, which may be present, in the cross-section of the pressure reduction valve, a small valve opening and a major narrowing in cross-section resulting in a greater throttling effect. Depending upon the particular design, therefore, the first pressure reduction valve 34 has a first throttling effect and the pressure reduction valve 36 has a second throttling effect. The throttling effect may be the same or different. In this connection, advantage may be taken of the fact that the wheel brakes associated with the front wheels of the land vehicle are often of larger design than the wheel brakes associated with the rear wheels. In this case, not only are the wheel brakes of larger design but the respective valves are also designed for greater volumes of through-flow.

On account of the throttling effect, the pressure difference between the braking pressure occurring in the wheel brakes 28, 30 and the pressure occurring in the temporary store 42 does not immediately return to zero after the opening of the pressure reduction valves 34, 36. On the contrary, this pressure difference is reduced by the flowing of the hydraulic fluid out of the wheel brakes 28, 30. Thus, although the braking pressure in said wheel brakes 28, 30 decreases as a result of the opening of the pressure reduction valves 34, 36, a certain amount of time elapses until the braking pressure is completely reduced. Under these circumstances, the speed of the reduction in pressure is determined by the volume flow via the pressure reduction valves 34, 36 and may be described as a "pressure reduction gradient".

When a regenerative braking operation occurs, part of the total braking torque is provided by the brake system 10 and the other part by the electric machine 50. So that the progress of the braking operation remains foreseeable for the driver, and no unexpected effects occur, the total braking torque composed of the hydraulic braking torque and the generating braking torque should correspond, during the overall braking operation, to the driver's desire to brake which is set by actuation of the brake pedal 12.

In the brake system 10 represented in FIG. 1, the isolating valves 22, 24, 26 are opened when a regenerative braking operation occurs. As a result, actuation of the brake pedal 12 by the driver brings about a displacement of volume from the master brake cylinder 16 to the wheel brakes 28, 30. Accordingly, the driver builds up a braking pressure, and therefore a hydraulic braking torque, in the wheel brakes 28, 30 by actuating the brake pedal 12.

Figure 2:
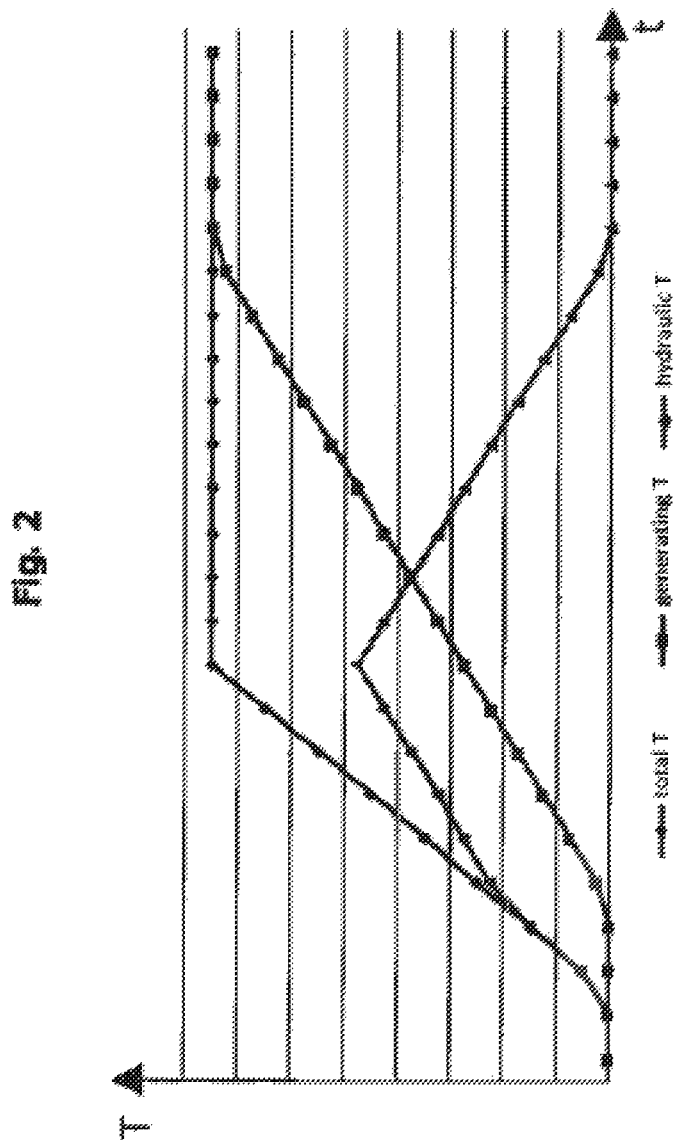
FIG. 2 shows the masking of a hydraulic braking torque in relation to a generating braking torque.

At the same time, or in a manner chronologically offset in relation to the building-up of braking pressure by the driver, the electric machine 50 also builds up a generating braking torque. So that the total braking torque also continues to comply with the driver's desire to brake, the control unit initiates a reduction, which corresponds to the building-up of the generating braking torque, in the hydraulic braking torque. This is represented in FIG. 2. Under these circumstances, the hydraulic braking torque is built up, whereas the building-up of the total braking torque diminishes. After the total braking torque has reached the desired value, the hydraulic braking torque is reduced accordingly. The replacement of the hydraulic braking torque by the generating braking torque, and vice versa, may also be described as "masking".

In order to reduce the hydraulic braking torque, the control unit 48 opens the first and/or the second pressure reduction valve(s) 34, 36. As a result of the flowing-away of the hydraulic fluid, the braking pressure in the wheel brakes 28, 30 decreases. The hydraulic braking torque is accordingly not built up to the same extent as the total braking torque. After the building-up, which is set by the driver, of the total braking torque has terminated, the hydraulic fluid which is flowing away brings about a reduction in the hydraulic braking torque.

By suitably varying the switching states of the pressure reduction valves 34, 36, the control unit 48 is able to use the first and second throttling effects in order to build up or reduce the braking pressure in the wheel brakes 28, 30, in a manner diminished to the extent to which the generating braking torque is built up. Since the throttling effect of the pressure reduction valves 34, 36 delays the reduction in pressure in the wheel brakes 28, 30, idle times and/or the inertia of the electric machine 50 in the building-up of the generating braking torque can be compensated for in a targeted manner.

Since the hydraulic braking torque is built up in a diminished manner, the driver can continue to be provided with a customary pedal reaction. This provides the driver with a reassuring braking sensation, even without a separate pedal reaction-simulating apparatus. The pedal reaction of the brake system designed in this way thus substantially corresponds to the pedal reaction of conventional brake systems or at least closely approximates to it.

Since the wheel brakes 28, 30 are connected to one another via the feed line 20, the opening of one of the pressure reduction valves 34, 36 brings about a reduction in pressure in both said wheel brakes 28, 30. If, for example, the control unit 48 opens the first pressure reduction valve 34, hydraulic fluid flows directly out of the first wheel brake 28. The hydraulic fluid from the second wheel brake 30 flows away through the feed line 20 and via the open first pressure reduction valve 34. If only one of the pressure reduction valves 34, 36 is opened, less hydraulic fluid is able to flow out of the wheel brakes 28, 30 to the temporary store 42. The reduction in pressure in the wheel brakes 28, 30 therefore take place more slowly than if both the pressure reduction valves 34, 36 were opened. More time is accordingly available for the building-up of the generating braking torque. Also, the flowing-away of the hydraulic fluid via a pressure reduction valve can be controlled more precisely. Thus, the control unit 48 is able to open the pressure reduction valve which brings about a reduction in pressure which best corresponds to the building-up of the generating braking torque.

As a result of the reduction in pressure in the wheel brakes 28, 30, the pressure difference via the open pressure reduction valve becomes smaller on account of the almost constant pressure in the temporary store 42. This leads to the pressure reduction gradient decreasing super-proportionally, that is to say, the reduction in pressure in the wheel brakes 28, 30 takes place more slowly. In a first phase of the reduction in pressure, therefore, the control unit 48 is able to open the pressure reduction valve with the greater throttling effect and, in a second phase of the reduction in pressure, close the pressure reduction valve with the greater throttling effect and open the pressure reduction valve with the smaller throttling effect, the braking pressure in the first phase being greater than in the second phase.

In order to vary the speed of the reduction in pressure, the control unit 48 is able to activate the valves with a closed-open activation and/or a quasi-analogue activation. In the case of a closed-open activation, the valve is opened and closed alternately, so that the mean value of the flow-off quantity of the hydraulic fluid during the closed-open activation is reduced, compared to a completely open valve. In the case of a quasi-analogue activation, the valve is only partially activated, so that it only partially opens.

A further possibility for varying the braking pressure in the wheel brakes consists in the fact that the control unit 48 sets a delivery output for the pump 38. The result of this is that said pump 38 delivers hydraulic fluid from the temporary store 42 to the wheel brakes 28, 30. As a result of the displacement of volume from the temporary store 42 to the wheel brakes 28, 30, the reduction in pressure can be slowed down. The greater the delivery output set, the more hydraulic fluid is conveyed to the wheel brakes 28, 30. The control unit is able to set the delivery output in such a way that, in the wheel brakes 28, 30, the reduction in pressure is slowed down, the pressure remains constant or the pressure rises. As a result of a rise in pressure in the wheel brakes, it is possible, for example, to compensate for a drop in the generating braking torque. It is thus possible for at least one pressure reduction valve to be open throughout the regenerative braking operation.

If a more rapid build-up of pressure in the wheel brakes is necessary, in order to compensate for a sudden drop in the generating braking torque, the third isolating valve 26 can be closed. As a result of the closing of said third isolating valve 26, the master brake cylinder 16 can be isolated from the wheel brakes 28, 30. It is accordingly possible to prevent the rapid build-up of pressure in the wheel brakes, as a result of a major fluctuation in pressure in the master brake cylinder 16, from leading to a reaction at the brake pedal 12 which is perceptible to the driver.

Figure 3:
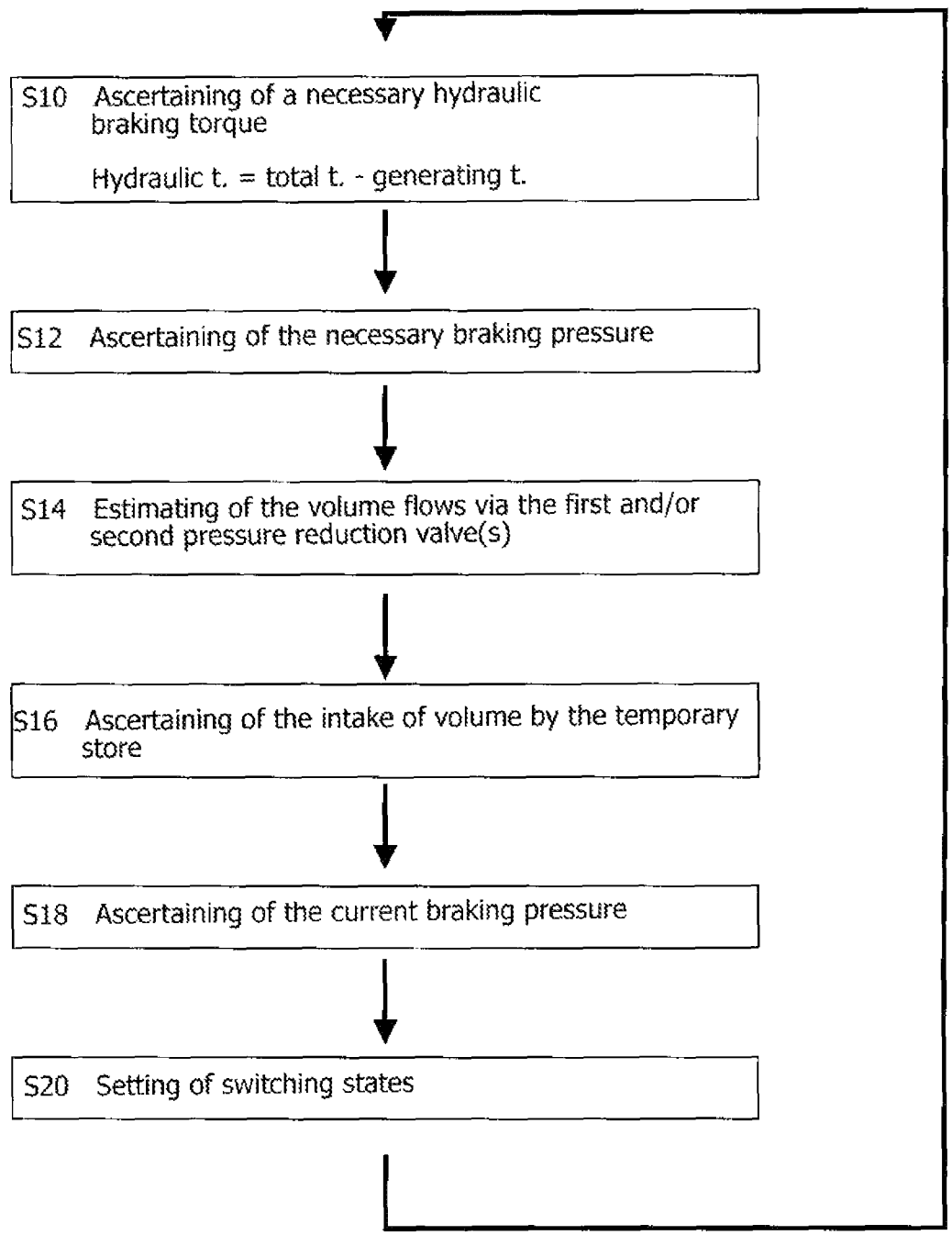
FIG. 3 shows steps for the purpose of ascertaining a necessary adaptation of the braking pressure.

Represented in FIG. 3 are steps by means of which the control unit 48 is able to ascertain whether a change in switching state is necessary. These steps can be repeated throughout the regenerative braking operation. The sequence in which the steps are carried out is not limited to the sequence represented in FIG. 3. On the contrary, the sequence can be varied. In addition, it is not necessary to carry out every step in the case of every repetition.

The control unit 48 controls the braking pressure in the wheel brakes 28, 30 in dependence upon the change in the generating braking torque. For this purpose, the control unit 48 ascertains, in step S10, the difference between a total braking torque which is set by the driver by actuation of the brake pedal 12, and the generating braking torque. This difference corresponds to the necessary hydraulic braking torque. From said necessary hydraulic braking torque, the control unit 48 ascertains a necessary braking pressure.

In step S14, the control unit estimates, on the basis of the switching states and of the first and second throttling effects, the volume flow via the first and/or the second pressure reduction valve(s) 34, 36. Under these circumstances, said first and second throttling effects may be deposited as parameters in a memory of the control unit 48. When estimating the volume flow via the pressure reduction valves, the control unit 48 may also take into account a deflection of the brake pedal 12 ascertained by the pedal travel sensor 46, and the speed of deflection of said brake pedal 12. In addition, the control unit 48 may store away in its memory, for the duration of a braking operation, the valve-switching states and their duration. The control unit 48 is able to ascertain the valve-switching states and their duration, for example, from the respective valve-controlling times.

In step S16, the control unit 48 ascertains, starting from the estimated volume flow via the first and/or the second pressure reduction valve(s), the intake of volume by the temporary store 42. For this purpose, said control unit 48 is able to take into account, for example, the stiffness of the springs contained in the temporary store 42 or the friction within said temporary store 42, corresponding parameters being deposited in the memory of the control unit 48.

In step S18, the control unit 48 estimates a current braking pressure on the basis of the deflection of the brake pedal 12 detected by the pedal travel sensor 46 and on the basis of the calculated intake of volume by the temporary store 42.

In step S20, the control unit 48 ascertains, in dependence upon the current braking pressure and the necessary braking pressure, whether adaptation of the braking pressure or adaptation of the speed of change in pressure in the wheel brakes 28, 30 is required. If the speed of the change in pressure is no longer suitable in order to compensate for a change in the generating braking torque, the control unit 48 is able to set other switching states for the pressure reduction valves 34, 36 and/or set a delivery output for the pump 38.

The control unit 48 is able to set the switching states of the pressure reduction valves 34, 36 in such a way that, as a rule, only one of said pressure reduction valves is open. In addition, the setting of the switching states may take place in such a way that, during a regenerative braking operation, the fewest possible changes in the switching states are necessary. Under these circumstances, the changes in the switching states of the pressure reduction valves 34, 36 take place with low frequency and asymmetrically. In this connection, "with low frequency" means that, for example, fewer changes of switching states are necessary than in a controlling operation of a slip-controlling system. Thus, for example, provision may be made for fewer than 5 changes of switching state per second. "Asymmetrical changes of switching states" means that the first and second pressure reduction valves are not activated simultaneously but in a chronologically offset manner and/or irregularly. Thus, for example, if the control unit 48 sets a change in switching states for two valves, said control unit 48 is able to active the second valve after the change in switching state of the first valve has been completed. It is thus possible to reduce noise generated by the changes in the switching states.

The brake booster 14 of the brake system 10 is adapted in such a way that the build-up of pressure in the master brake cylinder 16 until a first deflection of the brake pedal 12 occurs is determined only by said deflection of the brake pedal 12, that is to say there is pedal travel control. The first deflection may amount to, for example, 45 mm. The pressure in the master brake cylinder 16 when the first deflection occurs may amount, for example, to about 10-30 bar. Under these circumstances, the exact pressure is the result of the particular implementation of the brake booster 14, so that, when the first deflection occurs, the pressure may assume any value within the range mentioned. The pressure in the master brake cylinder may likewise fluctuate within tolerance limits, so that the pressure in the master brake cylinder may fluctuate within sub-ranges. Thus, the pressure may amount to, for example, 20-25 bar. However, other sub-ranges such as, for example, 15-25 bar, 20-30 bar or 10-20 bar are also possible. The transition from pedal travel control to force control may also be described as the intervention of the brake booster 14.

Until the first deflection or the corresponding pressure in the master brake cylinder 16 occurs, the driver still does not perceive any pedal force reaction caused by the pressure in the master brake cylinder 16. Thus, until the first deflection occurs, the piston of the master brake cylinder 16 is supported, via the sensing disc of the brake booster 14, on the valve housing of said brake booster 14 and not via the pedal input bar of the latter.

When a braking operation occurs, deflection of the brake pedal 12 brings about opening of the booster valve of the brake booster 14. Air flows through the open booster valve at atmospheric pressure into the working chamber of the brake booster 14. The air flowing in changes the pressure equilibrium between the chambers of the brake booster 14, so that the piston of the master brake cylinder 16, which piston is supported on the sensing disc, is pushed away from the brake booster 14. This brings about the building-up of pressure in the master brake cylinder 16. If the actuation of the brake pedal 12 by the driver remains the same, that is to say if the deflection of said brake pedal 12 is not changed, the booster valve of the brake booster 14 is closed. Accordingly, if the actuation of the brake pedal 12 remains the same, a pressure equilibrium sets in again between the chambers of the brake booster.

When a regenerative braking operation occurs, the braking pressure in the wheel brakes 28, 30 and, via the open isolation valves 22, 24, 26, the pressure in the master brake cylinder 16 are gradually reduced to the pressure level in the temporary store 42 as a result of the opening of the pressure reduction valves 34, 36. As a result of the drop in the supporting force of the master brake cylinder piston, the pressure equilibrium between the chambers of the brake booster 14 is disrupted. The valve housing of said brake booster 14 is accordingly displaced further in the direction of the master brake cylinder piston. As a result of the displacement of the valve housing of the brake booster, the volume of the working chamber is increased. Since the booster valve is closed, no additional air is able to flow into the working chamber. The increase in the volume of the working chamber caused by the displacement of the valve housing thus brings about a drop in pressure in said working chamber. The valve housing is therefore displaced sufficiently far in the direction of the master brake cylinder piston for a pressure equilibrium to set in again between the chambers of the brake booster.

Thus, even with the pressure reduction valves 34, 36 open, the driver is prevented from having the sensation of pressing the brake pedal 12 right down without any effect. No additional device is necessary for the purpose of simulating a customary pedal reaction force for the driver. In addition, the isolating valves 22, 24, 26 may remain open, at least until the intervention of the brake booster 14 occurs. Since, therefore, no change in the switching states of the isolating valves 22, 24, is required, the number of changes in switching state, and thereby the development of noise, can be reduced.

In order to design the reaction of the brake pedal in a manner which is more reassuring for the driver, a pedal simulation system, that is to say a device by which the reaction of the brake pedal 12 is changed, may be provided. Said pedal simulation system may provide, for example, a pedal response force of 22N, that is to say, the driver must apply a force of at least 22N in order to deflect the brake pedal 12 from the starting position. Until the first deflection occurs, the restoring force of the brake pedal may be increased to 30N by the pedal simulation system. Since no reactions of the master brake cylinder 16 are transmitted via the brake booster until the first deflection occurs, the increase in the brake pedal restoring force must take place independently of the reaction of the master cylinder, for example by means of a spring or a damper.

Another possibility for providing the driver with a reassuring braking sensation, and for avoiding pedal reactions as a consequence of variation of the braking pressure, consists in partially closing the first and second isolating valves 22, 24 after or during the pressure build-up as a result of actuation of the brake pedal 12. By partial closure of the first and second isolating valves 22, 24, it is possible to reduce the displacement of volume via the isolating valves, compared to a completely open isolating valve. The control unit 48 is thus able to set a desired throttling effect for the first and second isolating valves 22, 24. Since this throttling effect is substantially determined by the degree of activation by the control unit 48, the throttling effect of the first and second isolating valves 22, 24 may also be described as a throttling effect which can be adjusted in an analogue manner.

The control unit 48 is able to set the throttling effect, which can be adjusted in an analogue manner, of the isolating valves 22, 24 in dependence upon the course of the regenerative braking operation. Thus, the control unit 48 is able to set the throttling effect in dependence upon whether generating braking torque is built up, kept constant or reduced. In addition, the isolating valves 22, 24 may be activated in such a way that increasing deflection of the brake pedal 12 leads to increasing closure of said isolating valves 22, 24. Furthermore, the isolating valves 22, 24 may be opened slightly again if the braking torque deficit drops, that is to say, if the difference between the total braking torque and generating braking torque becomes smaller.

As a result of the partial closure of the isolating valves 22, 24, the driver may be provided with a customary braking sensation. In particular, the throttling effect adjusted by the control unit 48 prevents the driver from being provided with the feeling that he would press the brake pedal right down without any effect. In addition, the partial closure of the isolating valves 22, 24 takes place, to a very great extent, without the development of noise.

Land vehicles are indicated diagrammatically in FIGS. 4 and 5. A wheel brake (28a, 28b, 30a, 30b) is associated with the front left (VL), front right (VR), rear left (HL) and rear right (HR) wheels in each case. The wheel brakes (28a, 28b, 30a, 30b) are associated with two brake circuits. A diagonal distribution, also called an "X distribution" is represented in FIG. 4. A black-and-white distribution is represented in FIG. 5. Also represented in FIGS. 4 and 5 are the brake system 10, the control unit 48 the electric machine 50 and the control apparatus 52, said electric machine 50 being connected to the front axle of the land vehicle.

The electric machines 50 and electric control apparatuses 52 represented in FIGS. 4 and 5 may be adapted in such a way that the building-up of a generating braking torque takes place in dependence upon the throttling effect of the first and/or second pressure reduction valve(s) 34, 36. That is to say, the building-up of the generating braking torque takes place approximately to the extent to which the pressure in the wheel brakes decreases as a result of the flowing-away of the hydraulic fluid via the first and/or second pressure reduction valve(s) 34, 36. It is thereby possible to reduce the number of changes of switching state required.

In the black-and-white distribution of the brake circuits which is represented in FIG. 5, provision may be made for only the wheel brakes of the axle which is not acted upon by a generating braking torque to be braked. In the land vehicle represented in FIG. 5, the front axle of said land vehicle is acted upon by the generating braking torque, so that only the wheel brakes associated with the rear axle are acted upon by braking pressure. Since, as a rule, the building-up of the generating braking torque takes place in a delayed manner, the axle which is braked by the electric machine 50 is un-braked at the start of the braking operation. In order to compensate for the deficit in braking torque caused by the delayed building-up of the generating braking torque, the braking pressure in the wheel brakes of the hydraulically braked axle can be increased. For that purpose, the pump 38 may, for example, convey additional hydraulic fluid to the wheel brakes during the building-up of braking pressure brought about by the driver. This kind of distribution of the brake circuit and activation makes it possible for the axle braked by the electric machine to remain pressure-less from the outset, and for the braking pressure in the other axle to be capable of being adapted, when the generating torque is used, by the braking pressure controlling system described in connection with FIG. 1.

The variants previously described merely serve for a better understanding of the structure, mode of functioning and properties of the brake system; they do not restrict the disclosure to, for instance, the examples of embodiment. The figures are partly diagrammatic, essential properties and effects being represented, in some cases, in a significantly enlarged manner in order to illustrate the functions, operating principles, technical configurations and features. Under these circumstances, any mode of functioning, any principle, any technical configuration and any feature which is/are disclosed in the figures or in the text can be combined freely and in any desired manner with all the claims, any feature in the text and in the other figures, other modes of functioning, principles, technical configurations and features which are contained in this disclosure or result therefrom, so that all the conceivable combinations are to be attributed to the brake system described. These include also combinations between all the individual embodiments in the text, that is to say, in any section of the description, in the claims and also combinations between different variants in the text, in the claims and the figures.

Even the claims do not limit the disclosure and thereby the possible combinations, with one another, of all the features indicated. All the features disclosed are explicitly disclosed here, both individually and in combination with all the other features.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit of scope.

The invention claimed is:

1. A hydraulic brake system for a land vehicle, wherein the hydraulic brake system is adapted to enable a regenerative braking operation of said land vehicle, said system having:
    a brake pedal which can be actuated by the driver;
    a wheel brake which is associated with a wheel of the land vehicle;
    a master brake cylinder which is connected to the brake pedal via a brake booster and is adapted to displace hydraulic fluid into the wheel brake when the brake pedal is actuated;
    a pump;
    a return line extending between the pump and the wheel brake;
    the output of the pump is connected to the wheel brake via a feed line and the input of the pump is connected to the wheel brake via the return line, wherein the pump is adapted to convey hydraulic fluid to the wheel brake;
    a temporary store which is connected, via the return line, to the input of the pump and to the wheel brake;
    a pressure reduction valve which is arranged in the return line of the wheel brake and has a throttling effect in the open state;
    a control unit which is adapted to compensate, during a regenerative braking operation of the land vehicle, for the difference between a total braking torque set by the driver by actuation of the brake pedal and a generating braking torque provided by an electric machine by adjustment of a hydraulic braking torque, wherein the control unit, for the purpose of adjusting the hydraulic braking torque:
    ascertains a difference between the total braking torque and the generating braking torque;
    ascertains a necessary braking pressure from the difference of the total braking torque and the generating braking torque;
    estimates volume flows via the pressure reduction valve arranged in the return line on the basis of the switching state and the throttling effect of the pressure reduction valve;
    ascertains an intake of volume by the temporary store on the basis of the estimated volume flow;
    estimates a current braking pressure on the basis of a displacement of volume, which displacement corresponds to an actuating travel of the brake pedal, from the master brake cylinder to the wheel brake, and on the basis of the ascertained intake of volume by the temporary store; and
    sets a switching state for the pressure reduction valve arranged in the return line in dependence upon the ascertained necessary braking pressure and the current braking pressure.

2. The hydraulic brake system according to claim 1, wherein the wheel brake is at least two wheel brakes, and the pressure reduction valve is at least two pressure reduction valves, wherein the wheel brakes are combined to at least form one brake circuit, and wherein the control unit for adjusting the hydraulic braking torque may be further adapted to estimate, for each brake circuit, the volume flows via the pressure reduction valves on the basis of the respective switching states and throttling effects, and to set switching states for said pressure reduction valves in dependence upon the ascertained necessary braking pressure and the current braking pressure.

3. The hydraulic brake system according to claim 1, wherein the control unit is also adapted to set a delivery output for the pump such that the current braking pressure corresponds to the necessary braking pressure when the change in hydraulic braking torque caused by the open pressure reduction valve is not sufficient to compensate for the difference between the total braking torque and the generating braking torque.

4. The hydraulic brake system according to claim 3, wherein the delivery output set by the control unit corresponds to a displacement of volume to the wheel brakes, which displacement is smaller than, equal to or greater than the displacement of volume via the open pressure reduction valve.

5. The hydraulic brake system according to claim 1, having a first isolating valve and a second isolating valve and the wheel brake is a first wheel brake and a second wheel brake, wherein said first and said second isolating valve are adapted to completely or partially shut off a respective feed line to the first or second wheel brake respectively.

6. The hydraulic brake system according to claim 5, wherein the control unit is also adapted to completely or partially close the first and the second isolating valve during the regenerative braking operation.

7. The hydraulic brake system according to claim 5, wherein the control unit is also adapted not to close the first and the second isolating valve until the brake booster is activated.

8. The hydraulic brake system according to claim 1, wherein the control unit and the pressure reduction valves are adapted in such a way that the control unit varies the throttling effect of the pressure reduction valve by the alternating opening and closing, or partial opening, of said pressure reduction valve.

9. The land vehicle having the hydraulic brake system according to claim 1, the electric machine and a control apparatus associated with said electric machine, wherein the control apparatus controls the building-up of the generating braking torque of the electric machine in dependence upon a pressure reduction gradient which is determined by the throttling effect.

10. The hydraulic brake system according to claim 1, wherein the control unit and the pressure reduction valves are adapted in such a way that the control unit varies the throttling effect of the pressure reduction valve by the partial opening of said pressure reduction valve.

11. A method for controlling a hydraulic brake system during a regenerative braking operation, wherein, in reaction to a desire to brake on the part of the driver, a control unit:
   ascertains a difference between a total braking torque and a generating braking torque provided by an electric machine, wherein the total braking torque corresponds to the desire to brake set by the driver;
   ascertains a necessary braking pressure from the difference in the total braking torque and the generating braking torque;
   estimates a volume flow via a pressure reduction valve on the basis of the switching state and the throttling effect of the pressure reduction valve, wherein the pressure reduction valve is arranged in a return line connecting the input of a pump and a wheel brake;
   ascertains an intake of volume by a temporary store connected to the return line on the basis of the estimated volume flow;
   estimates a current braking pressure on the basis of a displacement of volume, which displacement corresponds to an actuating travel of the brake pedal, from a master brake cylinder to a wheel brake, and on the basis of the calculated intake of volume by the temporary store; and
   opens the pressure reduction valve arranged in the return line in dependence upon the ascertained necessary braking pressure and the current braking pressure.

12. A non-transitory computer-readable data-carrier on which there is stored a computer-programming product which, when executed by a control unit of a brake system, executes the method defined in claim 11.

* * * * *